United States Patent
Kim et al.

(10) Patent No.: US 12,326,994 B2
(45) Date of Patent: Jun. 10, 2025

(54) TOUCH DEVICE AND DRIVING METHOD THEREOF

(71) Applicant: HiDeep Inc., Seongnam-si (KR)

(72) Inventors: Jongsik Kim, Seongnam-si (KR); Joohyun Go, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 17/975,714

(22) Filed: Oct. 28, 2022

(65) Prior Publication Data

US 2023/0135676 A1 May 4, 2023

(30) Foreign Application Priority Data

Nov. 4, 2021 (KR) ......................... 10-2021-0150748

(51) Int. Cl.
*G06F 3/041* (2006.01)
*G06F 3/044* (2006.01)

(52) U.S. Cl.
CPC .......... *G06F 3/0418* (2013.01); *G06F 3/0443* (2019.05); *G06F 3/0446* (2019.05)

(58) Field of Classification Search
CPC ...... G06F 3/041; G06F 3/044; G06F 3/04164; G06F 3/0443; G06F 3/0412
See application file for complete search history.

(56) References Cited

U.S. PATENT DOCUMENTS

| | | | | |
|---|---|---|---|---|
| 2010/0149128 A1* | 6/2010 | No | ......................... | G06F 3/0447 345/174 |
| 2013/0093724 A1* | 4/2013 | Liu | ......................... | G06F 3/046 345/173 |
| 2013/0249853 A1* | 9/2013 | Tanaka | ................ | G06F 3/04166 345/174 |
| 2013/0320994 A1* | 12/2013 | Brittain | ................. | G06F 3/0416 324/537 |
| 2013/0321010 A1* | 12/2013 | Cooley | ................. | G06F 3/0446 324/543 |
| 2016/0202833 A1* | 7/2016 | Kim | ...................... | G06F 3/0443 345/173 |
| 2017/0123528 A1* | 5/2017 | Hu | ......................... | G06F 3/0412 |
| 2017/0212599 A1* | 7/2017 | Sharma | ............... | G06F 3/04886 |
| 2018/0294289 A1* | 10/2018 | Wang | .................. | H01L 27/1262 |
| 2018/0313883 A1* | 11/2018 | Wu | ......................... | G01R 31/52 |
| 2019/0004654 A1* | 1/2019 | Gwon | .................. | H10K 59/131 |
| 2019/0294297 A1* | 9/2019 | Sasai | ..................... | G06F 3/0418 |
| 2020/0241679 A1* | 7/2020 | Fukami | ............... | G02F 1/13338 |

FOREIGN PATENT DOCUMENTS

| | | | |
|---|---|---|---|
| CN | 111880973 A | * | 11/2020 |
| CN | 113671258 A | * | 11/2021 |
| KR | 10-1015090 | | 2/2011 |
| KR | 10-2015-0114008 | | 10/2015 |
| WO | WO2014108048 | * | 7/2014 |

* cited by examiner

*Primary Examiner* — Md Saiful A Siddiqui
(74) *Attorney, Agent, or Firm* — LEX IP MEISTER, PLLC

(57) ABSTRACT

A touch device according to an embodiment includes: a plurality of touch electrodes; and a touch controller for measuring a voltage varied based on a short circuit resistance of the touch electrodes and detecting short-circuit states of the touch electrodes.

7 Claims, 14 Drawing Sheets

TOUCH DEVICE AND DRIVING METHOD THEREOF

CROSS-REFERENCE TO RELATED APPLICATION

This application claims priority to and the benefit of Korean Patent Application No. 10-2021-0150748 filed in the Korean Intellectual Property Office on Nov. 4, 2021, the entire contents of which are incorporated herein by reference.

BACKGROUND

Field

The present disclosure relates to a touch device and a driving method thereof.

Description of the Related Art

A touch sensor is installed in various terminals such as a mobile phone, a smart phone, a tablet PC, a laptop computer, a digital broadcasting terminal, a personal digital assistant (PDA), a portable multimedia player (PMP), or a global positioning system (GPS).

In the terminal, a touch sensor may be provided on a display panel for displaying images, or it may be provided in one area of the terminal body. A user interacts with the terminal by touching a touch sensor, so the terminal may provide an intuitive user interface to the user.

As the terminal has been recently slimmed, demands on thin touch sensors and display panels are increasing.

SUMMARY

An embodiment of the present disclosure may provide a touch device for detecting a short-circuit state of a touch electrode and a driving method thereof.

An embodiment of the present invention provides a touch device including: a plurality of touch electrodes; and a touch controller for measuring a voltage varied based on a short circuit resistance of the touch electrodes and detecting short-circuit states of the touch electrodes.

The short circuit resistance of the touch electrodes may be formed between one of the touch electrodes and a wire or an electrode to which a ground voltage is applied.

The touch controller may include an operational amplifier in which a reference voltage is applied to a non-inverted input end, a feedback resistor is connected between an output end and an inverted input end, and one of the touch electrodes is connected to the inverted input end.

The touch controller may include an operational amplifier in which one of the touch electrodes is connected to a non-inverted input end, a first resistor is connected between the non-inverted input end and a reference voltage, a feedback resistor is connected between an output end and an inverted input end, and a second resistor is connected between the inverted input end and the reference voltage.

The touch controller may include an operational amplifier in which one of the touch electrodes is connected to a non-inverted input end, a first resistor is connected between the non-inverted input end and a reference voltage, and an output end is connected to an inverted input end.

The touch controller may include an operational amplifier in which a first resistor is connected between an inverted input end and one of the touch electrodes, a first feedback resistor is connected between a non-inverted output end and the inverted input end, a second feedback resistor is connected between an inverted output end and a non-inverted input end, and a second resistor is connected between the non-inverted input end and a reference voltage, and a voltage at the output end may be a differential amplifying voltage of the voltage at the non-inverted output end and the voltage at the inverted output end.

The touch controller may determine one of the touch electrodes to be short-circuited when the voltage at the output end is greater than the reference voltage.

The wire to which the ground voltage is applied may be disposed on an edge of the touch electrode.

The electrode to which the ground voltage is applied may include a common electrode of a display panel disposed on a lower portion of the touch device.

A short circuit resistance of the touch electrodes may be formed between two adjacent touch electrodes of the touch electrodes and/or two touch electrodes traversing each other from among the touch electrodes.

The touch controller may include an operational amplifier in which a reference voltage is applied to a non-inverted input end, a feedback resistor is connected between an output end and an inverted input end, and one of the two touch electrodes is connected to the inverted input end, and a ground voltage may be applied to another of the two touch electrodes.

The touch controller may include an operational amplifier in which one of the two touch electrodes is connected to a non-inverted input end, a first resistor is connected between the non-inverted input end and a reference voltage, a feedback resistor is connected between an output end and an inverted input end, and a second resistor is connected between the inverted input end and the reference voltage, and a ground voltage may be applied to another of the two touch electrodes.

The touch controller may include an operational amplifier in which one of the two touch electrodes is connected to a non-inverted input end, a first resistor is connected between the non-inverted input end and a reference voltage, and an output end is connected to an inverted input end, and a ground voltage may be applied to another of the two touch electrodes.

The touch controller may include an operational amplifier in which a first resistor is connected between an inverted input end and one of the two touch electrodes, a first feedback resistor is connected between a non-inverted output end and the inverted input end, a second feedback resistor is connected between an inverted output end and a non-inverted input end, and a second resistor is connected between the non-inverted input end and a reference voltage, a ground voltage may be applied to another of the two touch electrodes, and the voltage at the output end may be a differential amplifying voltage of the voltage at the non-inverted output end and the voltage at the inverted output end.

The touch controller may determine the two touch electrodes to be short-circuited with each other when the voltage at the output end is greater than the reference voltage.

Another embodiment of the present invention provides a method for driving a touch device including: measuring a voltage varied based on a short circuit resistance of a plurality of touch electrodes; and detecting short-circuited stated of the touch electrodes by using the voltage.

The short circuit resistance of the touch electrodes may be formed between one of the touch electrodes and a wire or an electrode to which a ground voltage is applied.

The wire to which the ground voltage is applied may be disposed on an edge of the touch electrode.

The electrode to which the ground voltage is applied may include a common electrode of a display panel disposed on a lower portion of the touch device.

The short circuit resistance of the touch electrodes may be formed between two adjacent touch electrodes of the touch electrodes and/or two touch electrodes traversing each other from among the touch electrodes.

According to the embodiments, the defect of the touch device may be easily detected.

According to the embodiments, the short-circuit position of the touch electrode may be accurately detected.

DETAILED DESCRIPTION OF THE EMBODIMENTS

Figure 1:
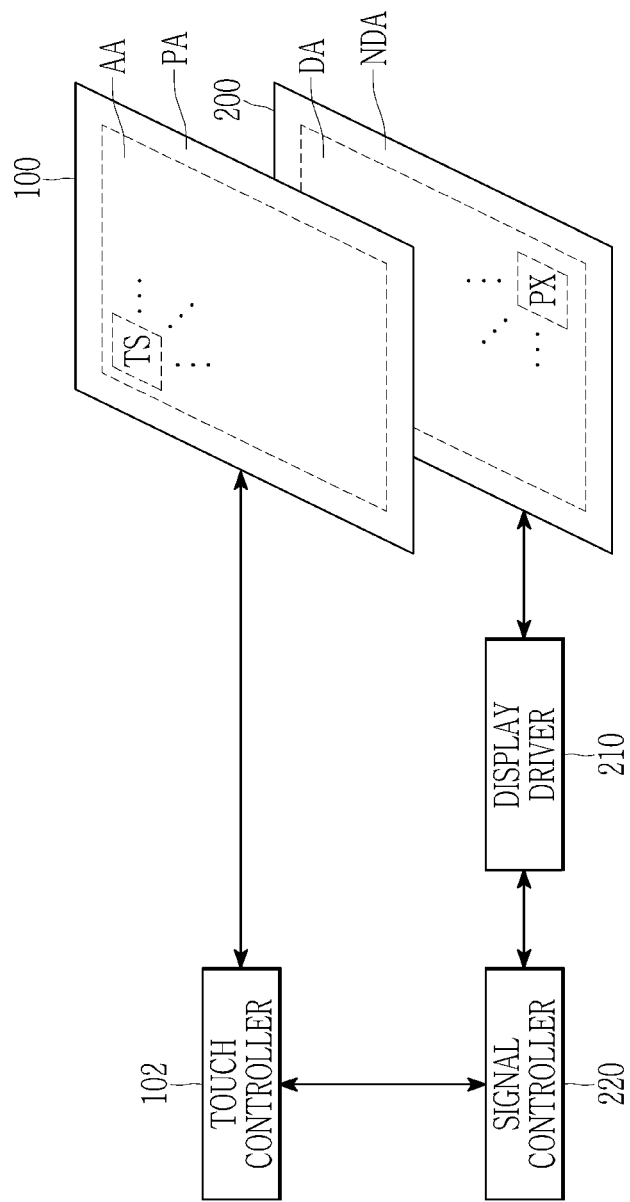
FIG. 1 shows a block diagram of a display device and a touch device according to an embodiment.

Various embodiments of the present document will be described with reference to the accompanying drawings. However, it is not intended to limit the techniques described herein to particular embodiments, and it should be understood as including various modifications, equivalents, and/or alternatives of the embodiments of this document. In connection with the description of the drawings, like reference numerals may be used for like components.

Further, since sizes and thicknesses of constituent members shown in the accompanying drawings are arbitrarily given for better understanding and ease of description, the present invention is not limited to the illustrated sizes and thicknesses. The thicknesses of layers, films, panels, regions, etc., are enlarged for clarity. The thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "on" or "above" means positioned on or below the object portion, and does not necessarily mean positioned on the upper side of the object portion based on a gravitational direction.

In this document, expressions such as "have", "may have", "includes", or "may include" refer to the presence of a corresponding characteristic (e.g., a numerical value, function, operation, or component such as a part), and does not exclude the presence of additional features.

In this document, expressions such as "A or B", "at least one of A or/and B", or "one or more of A or/and B" may include all possible combinations of the items listed together. For example, "A or B", "at least one of A and B", or "at least one of A or B" indicates (1) including at least A, (2) including at least B; or (3) may refer to all cases including both at least A and at least B.

Expressions such as "first" or "second" used in this document may modify various elements, regardless of order and/or importance, and may modify one element to another, it is used only to distinguish it from the components, and does not limit the components. For example, first user equipment and second user equipment may represent different user equipment regardless of order or importance. For example, without departing from the scope of the rights described in this document, a first component may be referred to as a second component, and similarly, the second component may also be renamed as the first component.

When a component (e.g., a first component) is (operatively or communicatively) "coupled or connected with/to" another component (e.g., a second component), it should be understood that one component may be connected to another component in a direct way or through another component (e.g., a third component). When a component (e.g., a first component) is directly "coupled or connected with/to" another component (e.g., a second component), it may be understood that no other component (e.g., a third component) exists between one component and another component.

As used in this document, the expression "configured to (or configured to)" depends on a situation, e.g., "suitable for", "having the capacity to", "designed to", "adapted to", "made to", or "capable of" may be used interchangeably. The term "configured (or configured to)" may not necessarily indicates only "specifically designed to" in hardware. Instead, in some circumstances, the expression "device configured to-" may indicate that the device is "capable of-" with other devices or components. For example, the phrase "a processor configured (or configured to perform) A, B, and C" may indicate a generic-purpose processor (e.g., a CPU or an application processor) capable of performing corresponding operations by executing one or more software programs stored in a dedicated processor (e.g., an embedded processor) or memory device for performing the corresponding operation.

Terms used in this document are only used to describe specific embodiments, and may not be intended to limit the scope of other embodiments. Singular forms are to include plural forms unless the context clearly indicates otherwise. Terms used herein, including technical or scientific terms, may have the same meanings as commonly understood by one of ordinary skill in the art described in this document. Among the terms used in this document, terms defined in a general dictionary may be interpreted as having the same or similar meaning as the meaning in the context of the related art, and unless explicitly defined in this document, it should not be construed in an ideal or overly formal sense. In some cases, even terms defined in this document may not be construed to exclude embodiments of this document.

An electronic device according to various embodiments of the present document may include, e.g., at least one of a smartphone, a tablet personal computer, a mobile phone, a video phone, and an e-book reader, a laptop personal computer (PC), a netbook computer, a mobile medical device, a camera, or a wearable device. According to various embodiments, the wearable device may include at least one of an accessory type (e.g. a watch, a ring, a bracelet, an anklet, a necklace, eyeglasses, a contact lens, or a head-mounted-device (HMD)); (e.g. a skin pad or tattoo), or a bio-implantable (e.g. an implantable circuit).

An electronic device and a driving method thereof according to embodiments will now be described with reference to necessary drawings.

FIG. 1 shows a block diagram of a display device and a touch device according to an embodiment. Referring to FIG. 1, a display panel 200 is connected to a display driver 210, and a touch sensor 100 is connected to a touch controller 102.

FIG. 1 shows that the touch sensor 100 is separated from the display panel 200 according to an embodiment, and the present disclosure is not limited thereto. For example, the touch sensor 100 and the display panel 200 may be integrally manufactured.

The touch sensor 100 may be provided in at least one region of the display panel 200. For example, the touch sensor 100 may be provided on at least side of the display panel 200 so that it may overlap the display panel 200. For example, the touch sensor 100 may be disposed on one (e.g., upper side) of respective sides of the display panel 200, in a direction in which images are output.

The touch sensor 100 may be formed on at least one of the respective sides of the display panel 200 or may be formed inside the display panel 200. For example, the touch sensor 100 may be formed on an upper substrate (or an encapsulation layer) of the display panel 200 or an external side (e.g., an upper side of the upper substrate or a bottom surface of the lower substrate) of the lower substrate, or may be formed on an internal side (e.g., a bottom surface of the upper substrate or an upper side of the lower substrate) of the upper substrate or the lower substrate.

When the touch sensor 100 is formed on the encapsulation layer of the display panel 200, an entire thickness of the encapsulation layer may be 1 μm to 10 μm.

The touch sensor 100 may include an active area AA for sensing touch inputs and a peripheral area PA for surrounding at least part of the active area AA. According to embodiments, the active area AA may be disposed to correspond to the display area DA of the display panel 200, and the peripheral area PA may be disposed to correspond to the non-display area NDA of the display panel 200. For example, the active area AA of the touch sensor 100 may overlap the display area DA of the display panel 200, and the peripheral area PA of the touch sensor 100 may overlap the non-display area NDA of the display panel 200.

According to an embodiment, a plurality of touch sensing units TS may be disposed in the active area AA. That is, the active area AA may be a touch sensing area for sensing a touch input of a user.

Figure 2:
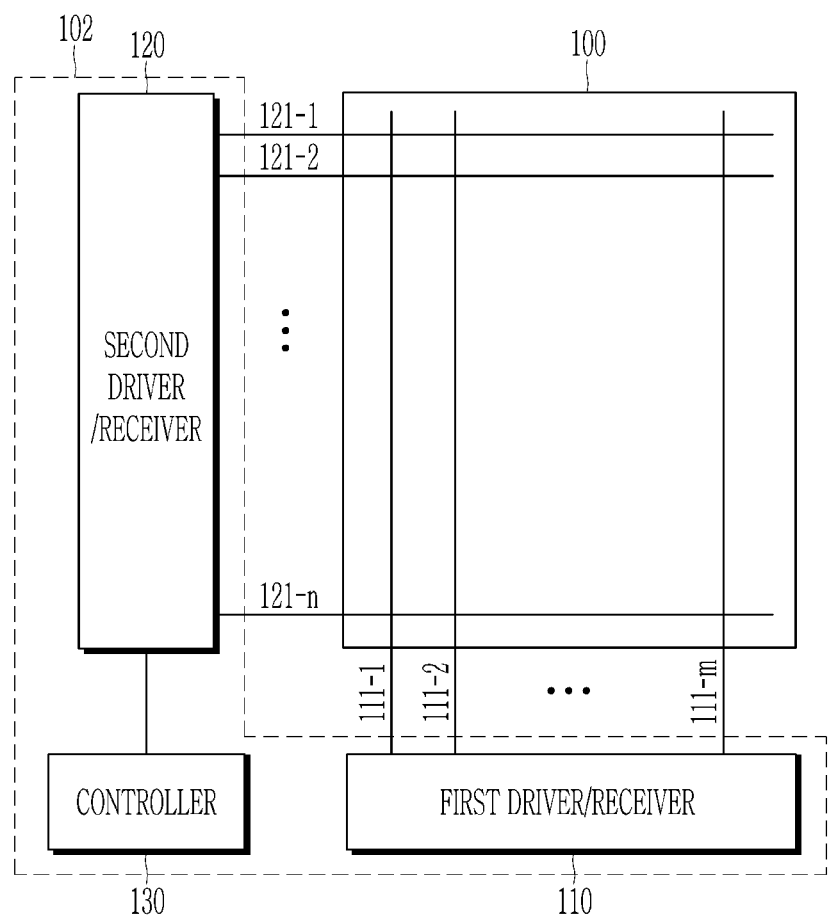
FIG. 2 shows a touch device according to an embodiment.

The touch sensing units TS may include at least one touch electrode for detecting touch input, for example, in the case of a mutual capacitance type, it may include a plurality of first touch electrodes 111-1 to 111-$m$ shown in FIG. 2 and a plurality of second touch electrodes 121-1 to 121-$n$ shown in FIG. 2. In detail, one touch sensing unit TS may be a unit for detecting a change of capacitance formed by crossing one first touch electrode and one second touch electrode.

In the case of self-capacitance, the touch sensing units TS may include a plurality of touch electrodes arranged in a matrix format. Specifically, one touch sensing unit TS may be a unit for detecting a change of capacitance of one touch electrode.

Depending on embodiments, at least one touch electrode may be provided to the display area DA of the display panel 200. In this case, at least one touch electrode may overlap at least one of the electrodes and wires provided in the display panel 200 on a plane. For example, when the display panel 200 is provided as an organic light emitting display panel, at least one touch electrode may at least overlap a cathode, a data line, a scan line, and the like. When the display panel 200 is a liquid crystal display panel, at least one touch electrode may at least overlap a common electrode, a data line, a gate line, and the like.

When the touch sensor 100 is combined to the display panel 200, an electric short-circuit may be generated between the touch sensor 100 and the display panel 200. For example, at least one touch electrode of the touch sensor 100 may be short-circuited from at least one electrode of the display panel 200 and the wire through the encapsulation layer on which defects are generated.

Regarding the touch device according to an embodiment, the display panel 200 may be an organic light emitting display panel having an encapsulation layer, and the touch sensor 100 may be formed of on-cell type sensor electrodes such that at least one touch electrode is directly formed on one side (e.g., the top surface) of the encapsulation layer. In this case, electric short-circuit may be generated between the touch sensor 100 and the display panel 200 when at least one (for example, a cathode) of the electrode and the wire provided on the organic light emitting display panel is positioned near at least one touch electrode, and a defect is generated on the encapsulation layer.

The touch controller 102 may detect the defect of the touch sensor 100. For example, the touch controller 102 may detect whether the touch sensing unit TS included in the touch sensor 100 is short-circuited. The touch controller 102 may also detect a short-circuit position of the touch sensing unit TS.

The touch controller 102 may generate a driving signal to be output to the touch sensor 100, and may receive a detection signal input from the touch sensor 100. The touch controller 102 may determine a touch input state, the number of touch inputs, and positions of the touch inputs on a touch screen by using a driving signal and a detection signal.

The display driver 210 may include a scan driver and a data driver for supplying signals to pixels PX included in the display panel 200. The signal controller 220 may supply a driving control signal and image data to the display driver 210, and may control an image displaying operation of the display panel 200.

In detail, the signal controller 220 may generate the driving control signal and the image data by using an image signal and a data enable signal supplied from an external image source. For example, the signal controller 220 may receive an image signal and a control signal from an external image source (not shown), and the control signal may include a vertical synchronization signal for distinguishing frame sections, a horizontal synchronization signal for distinguishing rows in one frame, a data enable signal having a high level for a section when data are output, and clock signals. The driving control signal may also include a scan driving control signal and a data driving control signal.

FIG. 2 shows a touch device according to an embodiment. Referring to FIG. 2, the touch device according to an embodiment may include a touch sensor 100, and a touch controller 102 for controlling the touch sensor 100. The touch controller 102 may include first and second drivers/receivers 110 and 120 for transmitting/receiving signals to/from the touch sensor 100, and a controller 130.

The touch sensor 100 may include a plurality of first touch electrodes 111-1 to 111-$m$ extending in a first direction and a plurality of second touch electrodes 121-1 to 121-$n$ extending in a second direction traversing the first direction. Regarding the touch sensor 100, a plurality of first touch electrodes 111-1 to 111-$m$ may be arranged in the second direction, and a plurality of second touch electrodes 121-1 to 121-$n$ may be arranged in the first direction. FIG. 2 shows the touch sensor 100 in a quadrangular shape, which is not limited thereto.

The first touch electrodes 111-1 to 111-$m$ are connected to the first driver/receiver 110, and the second touch electrodes 121-1 to 121-$n$ are connected to the second driver/receiver 120. The first driver/receiver 110, the second driver/receiver 120, and the controller 130 are separately shown in FIG. 2, and they may be realized into one module, unit, or chip, and are not limited thereto.

The first driver/receiver 110 may apply driving signals to the first touch electrodes 111-1 to 111-$m$. The first driver/receiver 110 may receive detection signals from the first touch electrodes 111-1 to 111-$m$. In a like way, the second driver/receiver 120 may apply driving signals to the second touch electrodes 121-1 to 121-$n$. The second driver/receiver 120 may receive detection signals from the first touch electrodes 121-1 to 121-$n$. That is, the first driver/receiver 110 and the second driver/receiver 120 may be transceivers for transmitting and receiving signals, and may respectively include a driver and a receiver.

The controller 130 may control all driving of the touch device 10, and may output touch information by using detection signals transmitted from the first driver/receiver 110 and the second driver/receiver 120.

Figure 3:
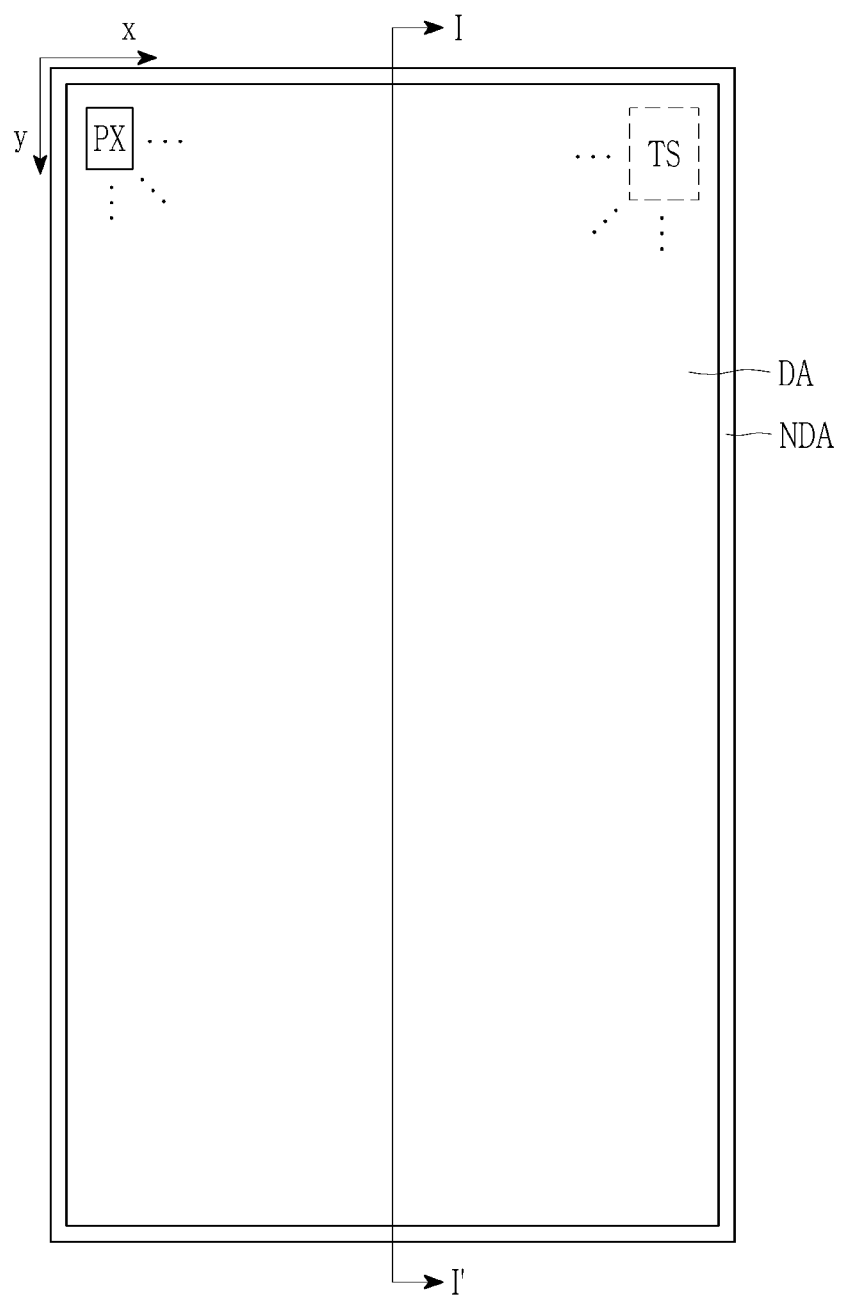
FIG. 3 shows a top plan view of part of a display device having a touch device according to an embodiment.
Figure 4:
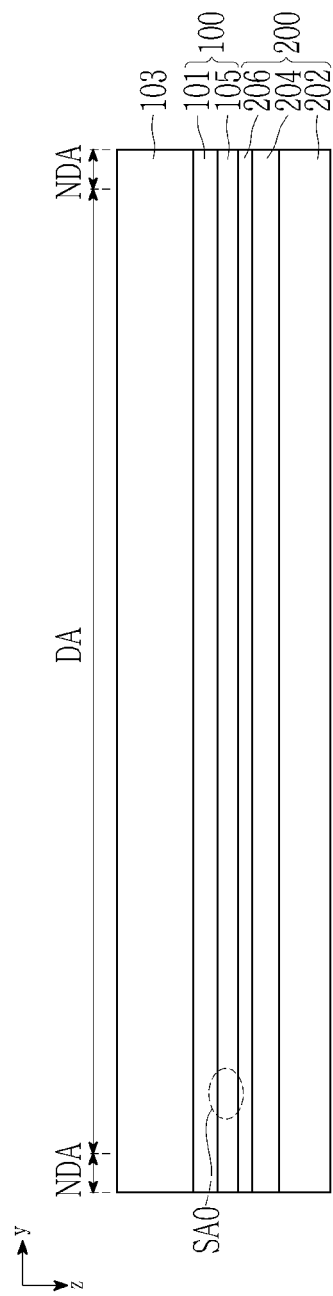
FIG. 4 shows a cross-sectional view with respect to a line I-I' of FIG. 3.

FIG. 3 shows a top plan view of part of a display device having a touch device according to an embodiment, and FIG. 4 shows a cross-sectional view with respect to a line I-I' of FIG. 3.

Referring to FIG. 3 and FIG. 4, the display panel 200 may display arbitrary visual information, for example, text, video, photographs, or 2-dimensional or 3-dimensional images. The display panel 200 displays images and its type is not specifically limited. In an embodiment, the display panel 200 may be exemplified to be a panel that is a light-emitting device and includes organic light-emitting diodes. However, the type of the display panel 200 is not limited thereto, and other display panels are usable within the range that fits the concept of the present disclosure.

The display panel 200 may have various shapes. For example, the display panel 200 may be a rectangle having two pairs of parallel sides. For ease of description, the display panel 200 is shown to be a rectangle with a pair of long sides and a pair of short sides.

However, the shape of the display panel 200 is not limited thereto, and the display panel 200 may have various shapes. For example, the display panel 200 may have various shapes such as a semi-circle or a semi-oval including a side made of a straight line and a curve such as a closed polygon including a straight side, and a circle or an oval including a curved side. At least part of an edge of the display panel 200 may have a curved shape.

An entire portion or at least part of the display panel 200 may be flexible.

The display panel 200 may display images. The display panel 200 may include a display unit 204, and the display unit 204 may include a display area DA for displaying images and a non-display area NDA positioned on at least one side of the display area DA. For example, the non-display area NDA may surround the display area DA. A plurality of pixels PX may be positioned in the display area DA, and a driver (refer to 210 of FIG. 1) for driving the pixels PX may be positioned in the non-display area NDA.

The display area DA may have a shape that corresponds to the shape of the display panel 200. For example, in a like way of the shape of the display panel 200, the display area DA may have various shapes such as a semi-circle or a semi-oval including a side made of a straight line and a curve such as a closed polygon including a straight side, and a circle or an oval including a curved side. In an embodiment of the present disclosure, the display area DA may be assumed to be a rectangle.

The display panel 200 may include a substrate 202 and a display unit 204 provided on the substrate 202.

For example, the substrate 202 may be made of various materials such as glass or a polymer metal. The substrate 202 may particularly be an insulating substrate made of a polymer organic material. An insulating substrate material including a polymer organic material includes polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material of the substrate 202 is not limited thereto, and for example, the substrate 202 may be made of a fiber glass reinforced plastic (FRP).

The display unit 204 may be positioned on the substrate 202. The display unit 204 may display information input by a user or information provided to the user as images. The display unit 204 may include a plurality of pixels PX. The pixels PX may be organic light emitting elements including an organic layer, but this is not restrictive, and they may be implemented in various forms, such as liquid crystal devices, electrophoretic devices, or electrowetting devices. The respective pixels PX are minimum units for displaying images, and they may include an organic light emitting element that emits white light and/or colored light. The respective pixels PX may emit any one of red, green, blue, and white light, but they are not restrictive, and may emit colored light such as cyan, magenta, or yellow. The respective pixels PX may include transistors (not shown) connected to a plurality of signal wires (not shown), and an organic light emitting diode electrically connected to the transistors.

A common electrode layer 206 may be positioned on the display unit 204. The common electrode layer 206 may include a common electrode for supplying a common voltage applied in common to the pixel PX.

The touch sensor 100 may be attached on the display panel 200 in an additional panel or film shape, and may be integrally formed with the display panel 200.

The touch sensor 100 may include a touch electrode layer 101 positioned on a substrate 105 (an encapsulation layer of the display panel 200 or an upper substrate).

A plurality of touch sensing units TS for sensing a position of a touch when the touch of the user is generated may be positioned on the touch electrode layer 101. The touch sensing unit TS may sense the touch according to a mutual capacitance scheme or a self-capacitance scheme. The touch sensing unit TS receives driving signals from the touch controller 102 of FIG. 1. The touch controller may receive sensing signals that are variable by the touch of the user from the touch sensing unit TS.

When the touch electrode layer 101 is formed on the substrate 105 to which defects or damages are generated, the touch electrode layer 101 may be electrically short-circuited SA0 from the common electrode layer 206 through the defect portion of the substrate 105.

The window 103 may be positioned on the touch sensor 100. The window 103 may have a shape that corresponds to the shape of the display panel 200, and may cover at least part of a front side of the display panel 200. For example, when the display panel 200 is a rectangle, the window 103 may be a corresponding rectangle. When the display panel 200 is a circle, the window 103 may be a corresponding circle.

The images displayed on the display panel 200 may be transmitted to the outside through the window 103. The window 103 mitigates an external impact to prevent the display panel 200 from being damaged or malfunctioned because of the external impact. The external impact is a force from the outside, which can be expressed as pressure, stress, and the like, and may signify a force that causes a defect to occur in the display panel 200.

An entire portion or at least part of the window 103 may be flexible.

A touch device according to an embodiment will now be described in detail with reference to FIG. 5.

Figure 5:
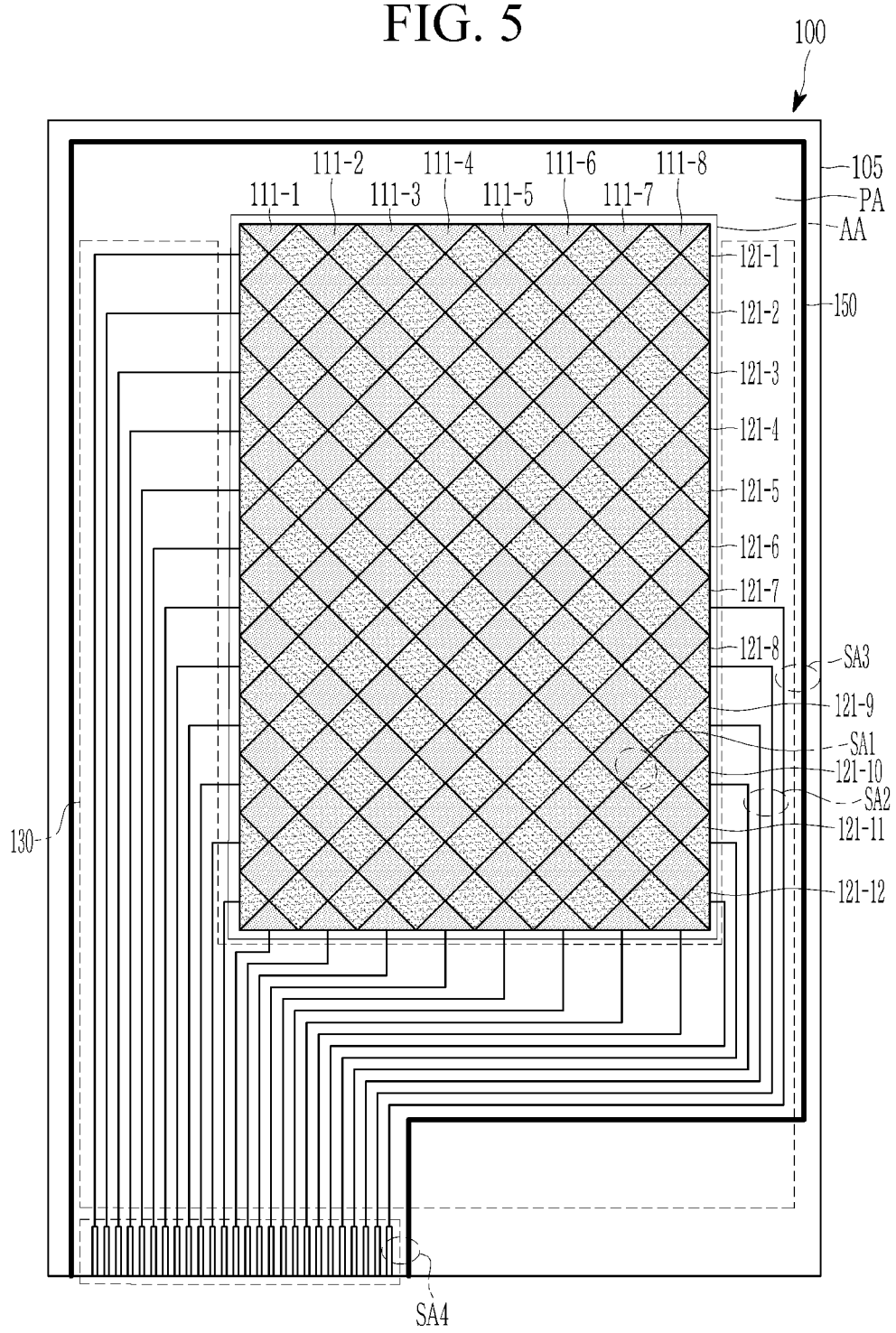
FIG. 5 shows a touch device according to an embodiment.

FIG. 5 shows a touch device according to an embodiment.

A plurality of first touch electrodes 111-1 to 111-8 extending in the first direction and a plurality of second touch electrodes 121-1 to 121-12 extending in the second direction traversing the first direction may be positioned on the substrate 105.

The first touch electrodes 111-1 to 111-8 and the second touch electrodes 121-1 to 121-12 may be alternately distributed and disposed so that they may not overlap each other in the active area AA. The first touch electrodes 111-1 to 111-8 may be respectively disposed in a column direction and a row direction, and the second touch electrodes 121-1 to 121-12 may be respectively disposed in the column direction and the row direction.

The first touch electrodes 111-1 to 111-8 and the second touch electrodes 121-1 to 121-12 may be positioned on a same layer.

The first touch electrodes 111-1 to 111-8 and the second touch electrodes 121-1 to 121-12 may be connected to the touch controller 102 through touch wires 130. The touch wires 130 may be positioned in the peripheral area PA, and differing from this, they may be positioned in the active area AA.

An end portion of the touch wires 130 may form a pad portion 140 in the peripheral area PA.

The first touch electrodes 111-1 to 111-8 and the second touch electrodes 121-1 to 121-12 may have more than predetermined transmission so that light may be transmitted from the display panel 200. For example, the first touch electrodes 111-1 to 111-8 and the second touch electrodes 121-1 to 121-12 may be made of a thin metal layer such as a metal mesh, an indium tin oxide (ITO), an indium zinc oxide (IZO), or silver nanowires (AgNw), or a transparent conductive material such as carbon nanotubes (CNT), but are not limited thereto.

The touch wires 130 may include the transparent conductive material or a low-resistance material such as molybdenum (Mo), silver (Ag), titanium (Ti), copper (Cu), aluminum (Ti), or molybdenum/aluminum/molybdenum (Mo/Al/Mo).

The first touch electrode 111 and the second touch electrode 121 neighboring each other may form a mutual sensing capacitor functioning as a contact sensor. The mutual sensing capacitor may receive a sensing input signal through one of the first touch electrode 111 and the second touch electrode 121 and may output a change of an amount of charges according to a contact of an external substance as a sensing output signal through the other touch electrode.

An antistatic wire 150 may be positioned in the peripheral area PA, for example, on an edge of the substrate 105. A ground voltage may be applied to the antistatic wire 150 to prevent static defects generated on the edge at the touch operation.

The electric short-circuits may be generated between the adjacent touch electrodes 111 and 121 (SA1), between the adjacent touch wires 130 (SA2), between the touch wires 130 and the antistatic wire 150 (SA3), and between the adjacent pad portion 140 and the antistatic wire 150 (SA3).

A method for detecting electric short-circuits generated by the touch sensor 100 may be described with reference to FIG. 6 to FIG. 17.

Figure 6:
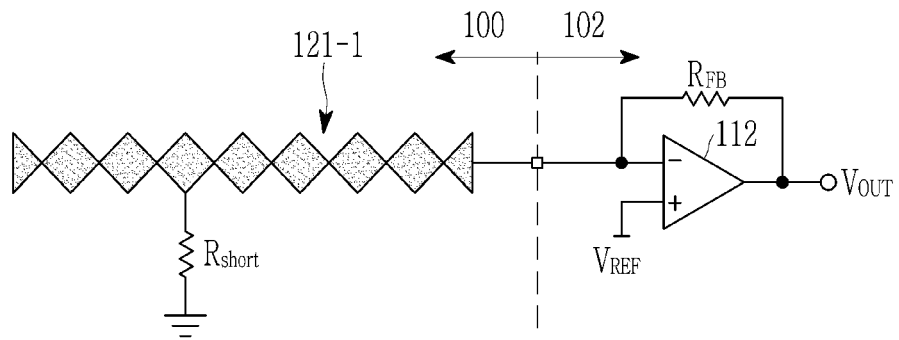
FIG. 6 shows a first aspect for detecting a short-circuit of a touch electrode according to a first embodiment.

FIG. 6 shows an example for detecting short-circuit of a touch electrode according to an embodiment.

As shown in FIG. 6, the touch controller 102 may include an inverting amplifier configured with an operational amplifier 112. The operational amplifier 112 may function as a buffer in the case of general touch driving. A feedback resistor $R_{FB}$ is connected between an output end $V_{OUT}$ of the operational amplifier 112 and an inverted input end. A second touch electrode 121-1 is connected to the inverted input end of the operational amplifier 112. A reference voltage $V_{REF}$ may be supplied to the non-inverted input end of the operational amplifier 112.

Here, a voltage at the output end $V_{OUT}$ may be calculated as in Equation 1.

$$V_{OUT} = \left(1 + \frac{R_{FB}}{R_{short}}\right) \times V_{REF} \quad \text{(Equation 1)}$$

When the second touch electrode 121-1 is electrically short-circuited with the wire or the electrode to which the ground voltage is applied, resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the wire or the electrode to which the ground voltage is applied (SA0 of FIG. 4, and SA3 and SA4 of FIG. 5). The resistance of the short circuit resistance $R_{short}$ becomes then very much small compared to the feedback resistor $R_{FB}$, so the voltage at the output end $V_{OUT}$ becomes higher than the reference voltage.

Hence, the short-circuited state on the wire or the electrode to which the ground voltage of the touch electrode may be detected.

Figure 7:
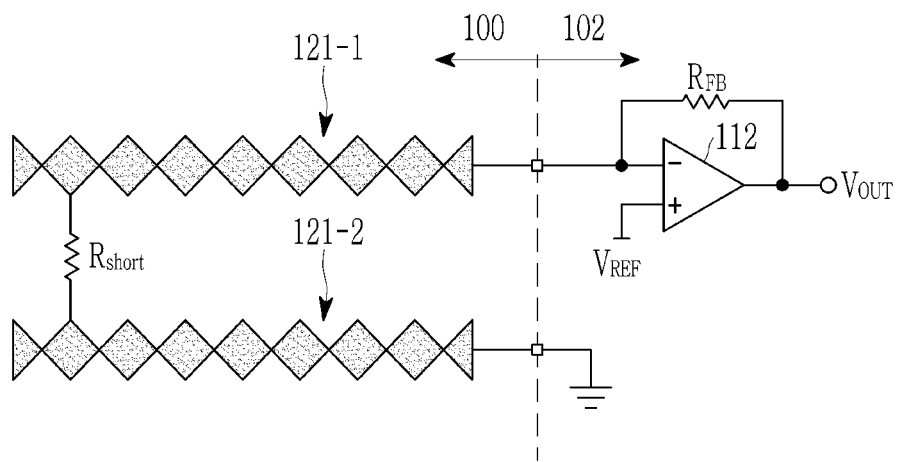
FIG. 7 shows a second aspect for detecting a short-circuit of a touch electrode according to a first embodiment.

FIG. 7 shows an example for detecting short-circuit of a touch electrode according to another embodiment.

As shown in FIG. 7, a feedback resistor $R_{FB}$ is connected between the output end $V_{OUT}$ and the inverted input end of the operational amplifier 112. A second touch electrode 121-1 is connected to the inverted input end of the operational amplifier 112. The reference voltage $V_{REF}$ may be supplied to the non-inverted input end of the operational amplifier 112.

The ground voltage may be applied to a second touch electrode 121-2 disposed near the second touch electrode 121-1.

The voltage at the output end $V_{OUT}$ may also be calculated as in Equation 1.

When the second touch electrode 121-1 is not electrically short-circuited with the adjacent second touch electrode 121-2, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the adjacent second touch electrode 121-2 (SA1 of FIG. 5), or the touch wire of the second touch electrode 121-1 may be electrically short-circuited with the adjacent touch wire (SA2 of FIG. 5). The resistance of the short circuit resistance $R_{short}$ becomes then very small compared to the feedback resistor $R_{FB}$, so the voltage at the output end $V_{OUT}$ becomes higher than the reference voltage.

Hence, the short-circuited state between the adjacent touch electrodes in the same type may be detected.

Figure 8:
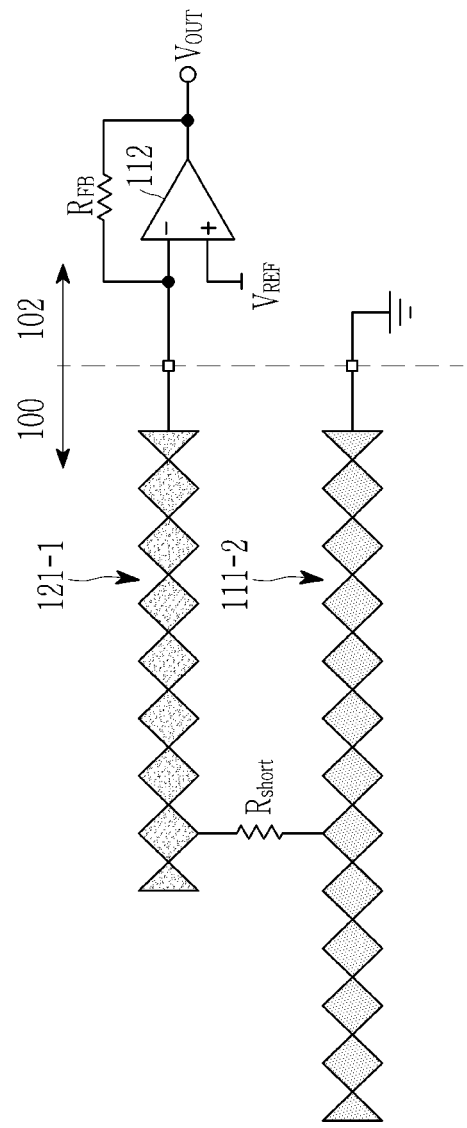
FIG. 8 shows a third aspect for detecting a short-circuit of a touch electrode according to a first embodiment.

FIG. 8 shows an example for detecting short-circuit of a touch electrode according to the other embodiment.

As shown in FIG. 8, the feedback resistor $R_{FB}$ is connected between the output end $V_{OUT}$ and the inverted input end of the operational amplifier 112. The second touch electrode 121-1 is connected to the inverted input end of the operational amplifier 112. The reference voltage $V_{REF}$ may be supplied to the non-inverted input end of the operational amplifier 112.

The ground voltage may be applied to the first touch electrode 111-2 traversing the second touch electrode 121-1.

The voltage at the output end $V_{OUT}$ may also be calculated as in Equation 1.

When the second touch electrode 121-1 is not electrically short-circuited with the first touch electrode 111-2, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the first touch electrode 111-2 (SA1 of FIG. 5), or the touch wire of the second touch electrode 121-1 may be electrically short-circuited with the adjacent touch wire (SA2 of FIG. 5). The resistance of the short circuit resistance $R_{short}$ then becomes very small compared to the feedback resistor $R_{FB}$, so the voltage at the output end $V_{OUT}$ becomes higher than the reference voltage.

Hence, the short-circuited state between the adjacent touch electrodes in the different types may be detected.

Figure 9:
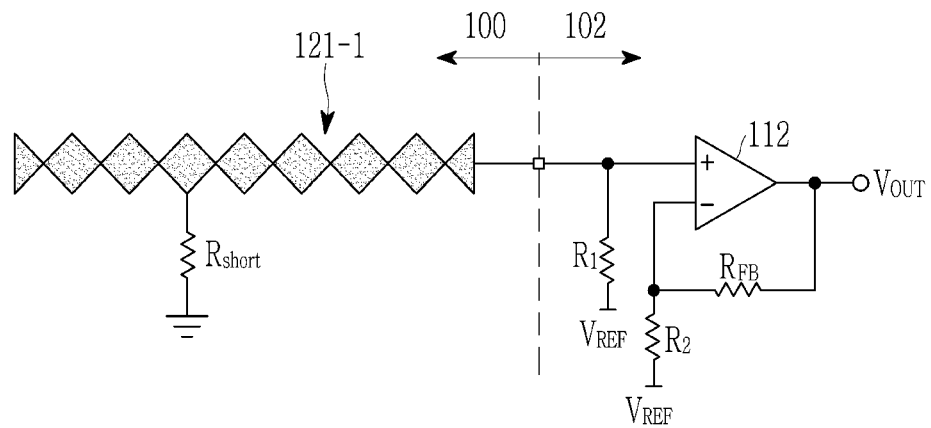
FIG. 9 shows a first aspect for detecting a short-circuit of a touch electrode according to a second embodiment.

FIG. 9 shows a first aspect for detecting a short-circuit of a touch electrode according to a second embodiment.

As shown in FIG. 9, the touch controller 102 may include a non-inverting amplifier configured with the operational amplifier 112. The operational amplifier 112 may function as a buffer in the case of general touch driving. A feedback resistor $R_{FB}$ is connected between an output end $V_{OUT}$ of the operational amplifier 112 and an inverted input end. A second resistor $R_2$ is connected between the inverted input end of the operational amplifier 112 and the reference voltage $V_{REF}$. The second touch electrode 121-1 is connected to the non-inverted input end of the operational amplifier 112. A first resistor $R_1$ is connected between the non-inverted input end of the operational amplifier 112 and the reference voltage $V_{REF}$.

Here, a voltage at the output end $V_{OUT}$ may be calculated as in Equation 2.

$$V_{OUT} = \left\{ \left( \frac{R_{short}}{R_{short} + R_1} \right) \left( 1 + \frac{R_{FB}}{R_2} \right) - \frac{R_{FB}}{R_2} \right\} V_{REF} \quad \text{(Equation 2)}$$

When the second touch electrode 121-1 is electrically short-circuited with the wire or the electrode to which the ground voltage is applied, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the wire or the electrode to which the ground voltage is applied (SA0 of FIG. 4, and SA3 and SA4 of FIG. 5). The resistance of the short circuit resistance $R_{short}$ becomes very small, so the voltage at the output end $V_{OUT}$ becomes lower than the reference voltage $V_{REF}$.

Hence, the short-circuited state on the wire or the electrode to which the ground voltage of the touch electrode may be detected.

Figure 10:
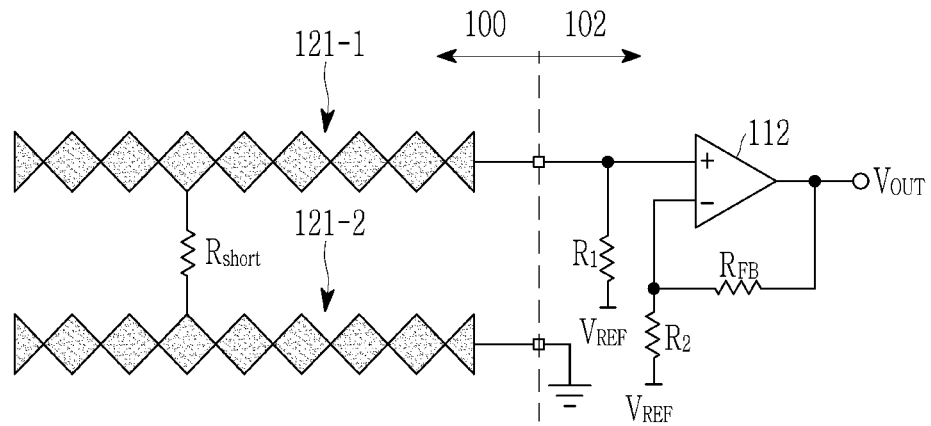
FIG. 10 shows a second aspect for detecting a short-circuit of a touch electrode according to a second embodiment.

FIG. 10 shows a second aspect for detecting a short-circuit of a touch electrode according to a second embodiment.

As shown in FIG. 10, a feedback resistor $R_{FB}$ is connected between the output end $V_{OUT}$ and the inverted input end of the operational amplifier 112. A second resistor $R_2$ is connected between the inverted input end of the operational amplifier 112 and the reference voltage $V_{REF}$. The second touch electrode 121-1 is connected to the non-inverted input end of the operational amplifier 112. A first resistor $R_1$ is connected between the non-inverted input end of the operational amplifier 112 and the reference voltage $V_{REF}$.

The ground voltage may be applied to the second touch electrode 121-2 disposed near the second touch electrode 121-1.

The voltage at the output end $V_{OUT}$ may also be calculated as in Equation 2.

When the second touch electrode 121-1 is not electrically short-circuited with the adjacent second touch electrode 121-2, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the adjacent second touch electrode 121-2 (SA1 of FIG. 5), or the touch wire of the second touch electrode 121-1 may be electrically short-circuited with the adjacent touch wire (SA2 of FIG. 5). The resistance of the short circuit resistance $R_{short}$ becomes very small, so the voltage at the output end $V_{OUT}$ becomes lower than the reference voltage.

Hence, the short-circuited state between the adjacent touch electrodes in the same type may be detected.

Figure 11:
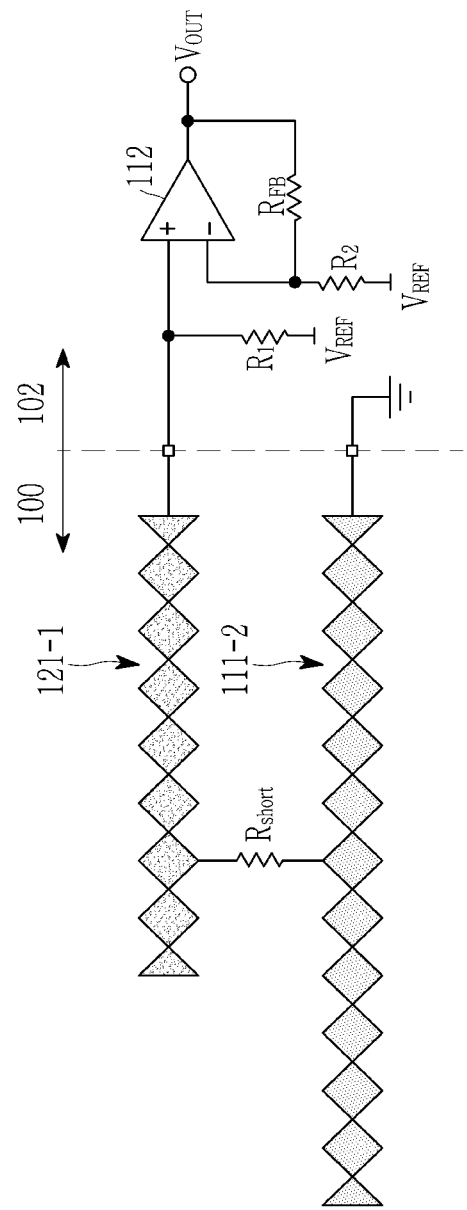
FIG. 11 shows a third aspect for detecting a short-circuit of a touch electrode according to a second embodiment.

FIG. 11 shows a third aspect for detecting a short-circuit of a touch electrode according to a second embodiment.

As shown in FIG. 11, a feedback resistor $R_{FB}$ is connected between the output end $V_{OUT}$ and the inverted input end of the operational amplifier 112. A second resistor $R_2$ is connected between the inverted input end of the operational amplifier 112 and the reference voltage $V_{REF}$. A second touch electrode 121-1 is connected to the non-inverted input end of the operational amplifier 112. A first resistor $R_1$ is connected between the non-inverted input end of the operational amplifier 112 and the reference voltage $V_{REF}$.

The ground voltage may be applied to the first touch electrode 111-2 traversing the second touch electrode 121-1.

The voltage at the output end $V_{OUT}$ may also be calculated as in Equation 2.

When the second touch electrode 121-1 is not electrically short-circuited with the first touch electrode 111-2, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the first touch electrode 111-2 (SA1 of FIG. 5), or the touch wire of the second touch electrode 121-1 may be electrically short-circuited with the adjacent touch wire (SA2 of FIG. 5). The resistance of the short circuit resistance $R_{short}$ becomes very small, so the voltage at the output end $V_{OUT}$ becomes lower than the reference voltage.

Hence, the short-circuited state between the adjacent touch electrodes in the different types may be detected.

Figure 12:
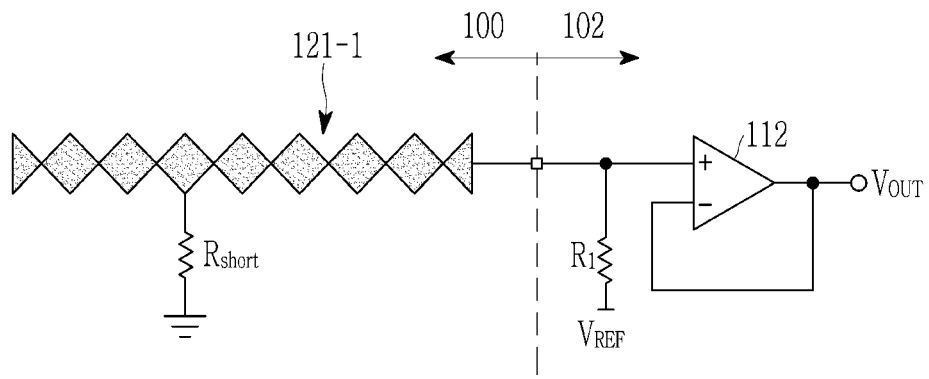
FIG. 12 shows a first aspect for detecting a short-circuit of a touch electrode according to a third embodiment.

FIG. 12 shows a first aspect for detecting a short-circuit of a touch electrode according to a third embodiment.

As shown in FIG. 12, the touch controller 102 may include a voltage follower configured with the operational amplifier 112. The operational amplifier 112 may function as a buffer in the case of general touch driving. The output end $V_{OUT}$ of the operational amplifier 112 is connected to the inverted input end. The second touch electrode 121-1 is connected to the non-inverted input end of the operational amplifier 112. The first resistor R1 is connected between the non-inverted input end of the operational amplifier 112 and the reference voltage $V_{REF}$.

Here, a voltage at the output end $V_{OUT}$ may be calculated as in Equation 3.

$$V_{OUT} = \left(\frac{R_{short}}{R_{short} + R_1}\right) V_{REF} \quad \text{(Equation 3)}$$

When the second touch electrode 121-1 is electrically short-circuited with the wire or the electrode to which the ground voltage is applied, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the wire or the electrode to which the ground voltage is applied (SA0 of FIG. 4, and SA3 and SA4 of FIG. 5). The resistance of the short circuit resistance $R_{short}$ becomes very small, so the voltage at the output end $V_{OUT}$ becomes lower than the reference voltage.

Hence, the short-circuited state on the wire or the electrode to which the ground voltage of the touch electrode may be detected.

Figure 13:
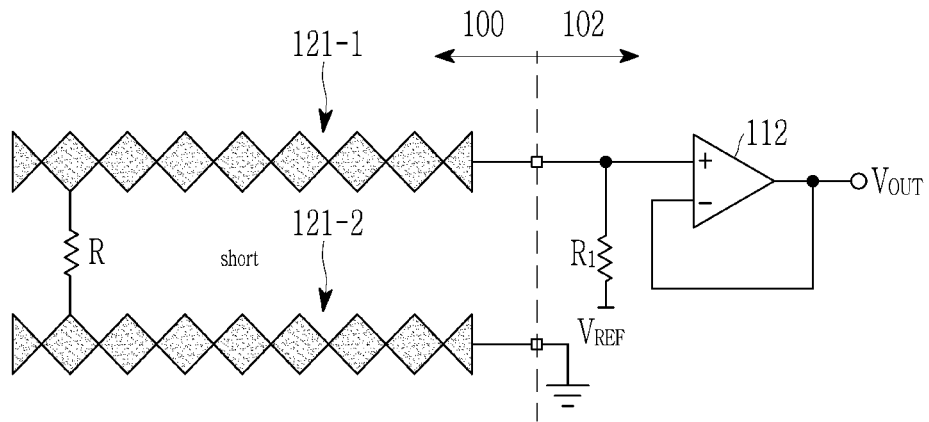
FIG. 13 shows a second aspect for detecting a short-circuit of a touch electrode according to a third embodiment.

FIG. 13 shows a second aspect for detecting a short-circuit of a touch electrode according to a third embodiment.

As shown in FIG. 13, an output end $V_{OUT}$ of the operational amplifier 112 is connected to the inverted input end. The second touch electrode 121-1 is connected to the non-inverted input end of the operational amplifier 112. The first resistor $R_1$ is connected between the non-inverted input end of the operational amplifier 112 and the reference voltage $V_{REF}$.

The ground voltage may be applied to the second touch electrode 121-2 disposed near the second touch electrode 121-1.

The voltage at the output end $V_{OUT}$ may also be calculated as in Equation 3.

When the second touch electrode 121-1 is not electrically short-circuited with the adjacent second touch electrode 121-2, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the adjacent second touch electrode 121-2 (SA1 of FIG. 5), or the touch wire of the second touch electrode 121-1 may be electrically short-circuited with the adjacent touch wire (SA2 of FIG. 5). The resistance of the short circuit resistance $R_{short}$ becomes very small, so the voltage at the output end $V_{OUT}$ becomes lower than the reference voltage.

Hence, the short-circuited state between the adjacent touch electrodes in the same type may be detected.

Figure 14:
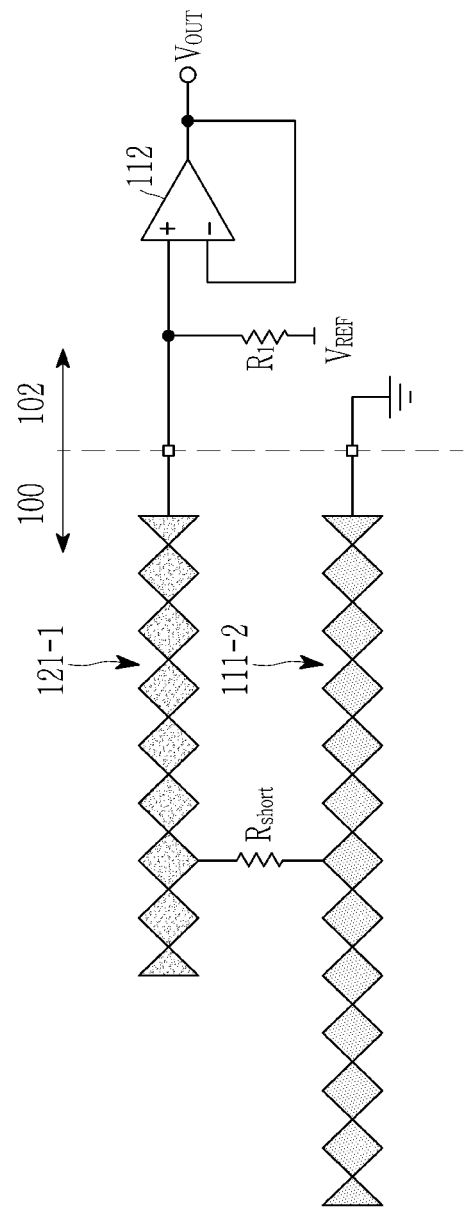
FIG. 14 shows a third aspect for detecting a short-circuit of a touch electrode according to a third embodiment.

FIG. 14 shows a third aspect for detecting a short-circuit of a touch electrode according to a third embodiment.

As shown in FIG. 14, the output end $V_{OUT}$ of the operational amplifier 112 is connected to the inverted input end. The second touch electrode 121-1 is connected to the non-inverted input end of the operational amplifier 112. The first resistor $R_1$ is connected between the non-inverted input end of the operational amplifier 112 and the reference voltage $V_{REF}$.

The ground voltage may be applied to the first touch electrode 111-2 traversing the second touch electrode 121-1.

The voltage at the output end $V_{OUT}$ may also be calculated as in Equation 3.

When the second touch electrode 121-1 is not electrically short-circuited with the first touch electrode 111-2, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the first touch electrode 111-2 (SA1 of FIG. 5), or the touch wire of the second touch electrode 121-1 may be electrically short-circuited with the adjacent touch wire (SA2 of FIG. 5). The resistance of the short circuit resistance $R_{short}$ becomes very small, so the voltage at the output end $V_{OUT}$ becomes lower than the reference voltage.

Hence, the short-circuited state between the adjacent touch electrodes in the different types may be detected.

Figure 15:
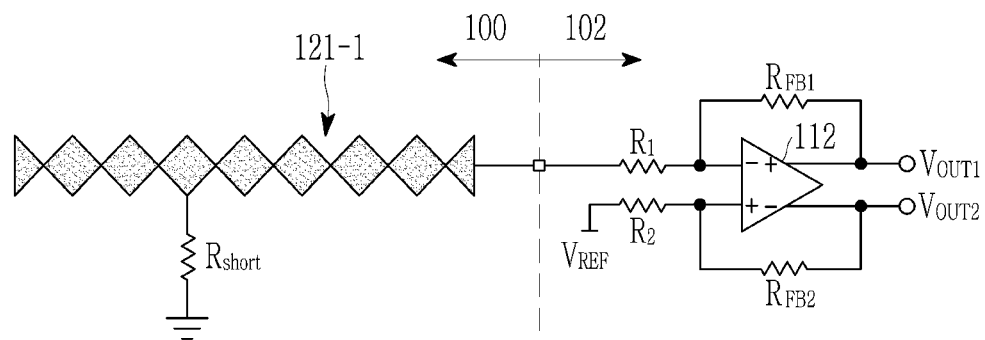
FIG. 15 shows a first aspect for detecting a short-circuit of a touch electrode according to a fourth embodiment.

FIG. 15 shows a first aspect for detecting a short-circuit of a touch electrode according to a fourth embodiment.

As shown in FIG. 15, the touch controller 102 may include a differential amplifier configured with the operational amplifier 112. The operational amplifier 112 may function as a buffer in the case of general touch driving. The feedback resistor $R_{FB1}$ is connected between the non-inverted output end $V_{OUT1}$ of the operational amplifier 112 and the inverted input end. The first resistor $R_1$ is connected between the inverted input end of the operational amplifier 112 and the second touch electrode 121-1. A feedback resistor $R_{FB2}$ is connected between an inverted output end $V_{OUT2}$ of the operational amplifier 112 and the non-inverted input end. A second resistor $R_2$ is connected between the non-inverted input end of the operational amplifier 112 and the reference voltage $V_{REF}$.

In this instance, the output voltage $V_{OUT}$ (i.e., the output voltage $V_{OUT}$) is a differential amplifying output voltage ($V_{out} = \alpha \cdot (V_{out1} - V_{out2})$, $\alpha \neq 0$) of the non-inverted output end $V_{OUT1}$ and the inverted output end $V_{OUT2}$ of the operational amplifier 112 may be expressed as in Equation 4.

$$V_{OUT} = \frac{1 + \frac{R_2}{R_{FB2}} - X}{\frac{R_2}{R_{FB2}} + X} \cdot 2 \cdot V_{REF} \text{ where,} \quad \text{(Equation 4)}$$

$$X = \frac{(R_1 + R_{short})(R_2 + R_{FB2})}{R_{FB2}(R_1 + R_{short} + R_{FB1})}$$

When the second touch electrode 121-1 is electrically short-circuited with the wire or the electrode to which the ground voltage is applied, resistance of the short circuit resistance $R_{short}$ becomes very large, so the voltage at the output end $V_{OUT}$) may be equal to the reference voltage, or may be substantially equivalent or similar to the same.

The second touch electrode 121-1 may be electrically short-circuited with the wire or the electrode to which the ground voltage is applied (SA0 of FIG. 4, and SA3 and SA4 of FIG. 5). The resistance of the short circuit resistance $R_{short}$ becomes very small, so the output voltage $V_{OUT}$ becomes higher than the reference voltage.

Hence, the short-circuited state on the wire or the electrode to which the ground voltage of the touch electrode may be detected.

Figure 16:
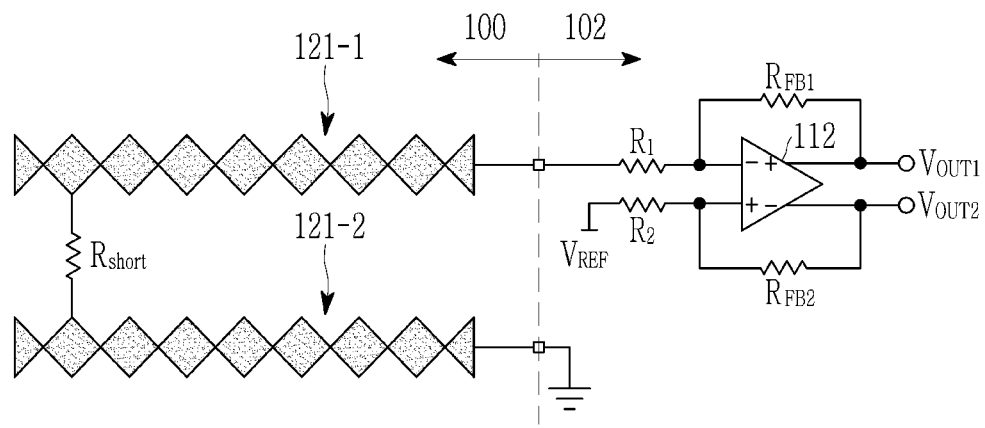
FIG. 16 shows a second aspect for detecting a short-circuit of a touch electrode according to a fourth embodiment.

FIG. 16 shows a second aspect for detecting a short-circuit of a touch electrode according to a fourth embodiment.

As shown in FIG. 16, the feedback resistor $R_{FB1}$ is connected between the non-inverted output end $V_{OUT1}$ and the inverted input end of the operational amplifier 112. The first resistor $R_1$ is connected between the inverted input end of the operational amplifier 112 and the second touch electrode 121-1. The feedback resistor $R_{FB2}$ is connected between the inverted output end $V_{OUT2}$ of the operational amplifier 112 and the non-inverted input end. The second resistor $R_2$ is connected between the non-inverted input end of the operational amplifier 112 and the reference voltage $V_{REF}$.

The ground voltage may be applied to the second touch electrode 121-2 disposed near the second touch electrode 121-1.

The voltage at the output end $V_{OUT}$ may also be calculated as in Equation 4.

When the second touch electrode 121-1 is not electrically short-circuited with the adjacent second touch electrode 121-2, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the adjacent second touch electrode 121-2 (SA1 of FIG. 5), or the touch wire of the second touch electrode 121-1 may be electrically short-circuited with the adjacent touch wire (SA2 of FIG. 5). The resistance of the short circuit resistance $R_{short}$ becomes very small, so the output voltage $V_{OUT}$ becomes higher than the reference voltage.

Hence, the short-circuited state between the adjacent touch electrodes in the same type may be detected.

Figure 17:
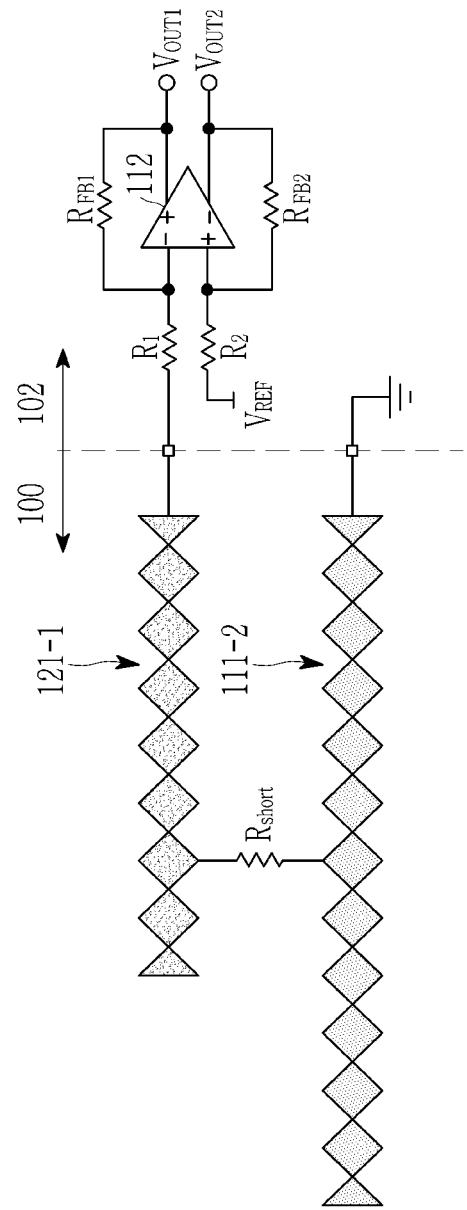
FIG. 17 shows a third aspect for detecting a short-circuit of a touch electrode according to a fourth embodiment.

FIG. 17 shows a third aspect for detecting a short-circuit of a touch electrode according to a fourth embodiment.

As shown in FIG. 17, a feedback resistor $R_{FB1}$ is connected between the non-inverted output end $V_{OUT1}$ and the inverted input end of the operational amplifier 112. The first resistor $R_1$ is connected between the inverted input end of the operational amplifier 112 and the second touch electrode 121-1. The feedback resistor $R_{FB2}$ is connected between the inverted output end $V_{OUT2}$ and the non-inverted input end of the operational amplifier 112. The second resistor $R_2$ is connected between the non-inverted input end of the operational amplifier 112 and the reference voltage $V_{REF}$.

The ground voltage may be applied to the first touch electrode 111-2 traversing the second touch electrode 121-1.

The output voltage $V_{OUT}$ may also be calculated as in Equation 4.

When the second touch electrode 121-1 is not electrically short-circuited with the first touch electrode 111-2, the resistance of the short circuit resistance $R_{short}$ becomes very large, so the voltage at the output end $V_{OUT}$ may be equal to the reference voltage, or may be substantially equivalent or similar to the same.

The second touch electrode 121-1 may be electrically short-circuited with the first touch electrode 111-2 (SA1 of FIG. 5), or the touch wire of the second touch electrode 121-1 may be electrically short-circuited with the adjacent touch wire (SA2 of FIG. 5). The resistance of the short circuit resistance $R_{short}$ becomes very small, so the output voltage $V_{OUT}$ becomes higher than the reference voltage.

Hence, the short-circuited state between the adjacent touch electrodes in the different types may be detected.

A method for driving a touch device according to an embodiment will now be described with reference to FIG. 18.

Figure 18:
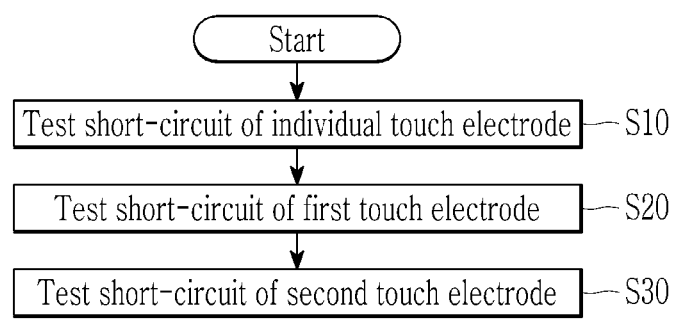
FIG. 18 shows a flowchart of a method for driving a touch device according to an embodiment.

FIG. 18 shows a flowchart of a method for driving a touch device according to an embodiment.

The touch controller 102 performs short-circuit tests on the respective touch electrodes (S10).

For example, the first driver/receiver 110 may detect whether the respective first touch electrodes 111-1 to 111-$m$ are electrically short-circuited to the wire or the electrode to which the ground voltage is applied. As shown in FIG. 6, the first driver/receiver 110 may apply the reference voltage $V_{REF}$ to the non-inverted input end of the operational amplifier 112, may connect the first touch electrodes 111-1 to 111-$m$ to the inverted input end, and may detect the short-circuit. The first driver/receiver 110 may include a plurality of operational amplifiers 112, and the operational amplifiers 112 may correspond to the first electrodes 111-1 to 111-$m$ and may be connected thereto. In a like way, the second driver/receiver 120 may detect whether the respective second touch electrodes 121-1 to 121-$n$ are electrically short-circuited with the wire or the electrode to which the ground voltage is applied.

The touch controller 102 performs a short-circuit test on the touch electrodes in the same type (S20).

For example, the first driver/receiver 110 may detect whether the respective first touch electrodes 111-1 to 111-$m$ are electrically short-circuited with each other. As shown in FIG. 7, the first driver/receiver 110 may apply the reference voltage $V_{REF}$ to the non-inverted input end of the operational amplifier 112, may connect the first touch electrodes 111-1 to 111-m to the inverted input end, and may apply the ground voltage to the second touch electrodes 121-1 to 121-n disposed near the first touch electrodes 111-1 to 111-m connected to the inverted input end to thus detect the electric short among the adjacent first touch electrodes 111-1 to 111-m. The first driver/receiver 110 may include a plurality of operational amplifiers 112, and the operational amplifiers 112 may correspond to the first electrodes 111-1 to 111-m and may be connected to the same. In a like way, the second driver/receiver 120 may detect whether the respective first touch electrodes 121-1 to 121-n are electrically short-circuited with each other.

The touch controller 102 performs a short-circuit test on the touch electrodes in different types (S30).

For example, the first driver/receiver 110 and the second driving receiver 120 may detect whether the first touch electrodes 111-1 to 111-m are electrically short-circuited with the second touch electrodes 121-1 to 121-n. As shown in FIG. 8, the first driver/receiver 110 may apply the reference voltage $V_{REF}$ to the non-inverted input end of the operational amplifier 112, may connect the first touch electrodes 111-1 to 111-m to the inverted input end, and may apply the ground voltage to the second touch electrodes 121-1 to 121-n traversing the first touch electrodes 111-1 to 111-m connected to the inverted input end to thus detect the electric short-circuit between the first touch electrodes 111-1 to 111-m and the second touch electrodes 121-1 to 121-n. The first driver/receiver 110 may include a plurality of operational amplifiers 112, and the operational amplifiers 112 may correspond to the first electrodes 111-1 to 111-m and may be connected to the same.

According to the embodiments, the defect of the touch device may be easily detected by using the buffer of the driver for driving the touch electrode. Further, it may be respectively detected whether the touch electrode is short-circuited with the wire or the electrode to which the ground voltage is applied or whether the touch electrode is short-circuited with another touch electrode, so the short-circuited position of the touch electrode may be accurately detected.

The electronic device according to various embodiments disclosed in this document may be various types of apparatus. The electronic device may include, e.g., a portable communication device (e.g., a smartphone), a computer device, a portable multimedia device, a portable medical device, a camera, a wearable device, or a home appliance device. The electronic device according to the embodiments of the present document is not limited to the above-described devices.

The various embodiments of this document and the terms used therein are not intended to limit the technical features described in this document to specific embodiments, and should be understood to include various modifications, equivalents, or substitutions of the embodiments. In connection with the description of the drawings, like reference numerals may be used for similar or related components. The singular form of the noun corresponding to the item may include one or more of the item, unless the relevant context clearly dictates otherwise. As used herein, each of the phrases "A or B", "at least one of A and B", "at least one of A or B," "A, B or C," "at least one of A, B, and C," and "at least one of A, B, or C" may include all possible combinations of the items listed together in the corresponding one of the phrases. Terms such as "1st", "2nd", "first", or "second" may simply be used to distinguish a component from another component, and the component is not limited in another aspect (e.g., importance or order). When one (e.g., first) component is "coupled" or "connected" to another (e.g., second) component, with or without the terms "functionally" or "communicatively", this indicates that one component may be connected to the other component directly (e.g., by wire), wirelessly, or through a third component.

As used herein, the term "module" may include a unit implemented in hardware, software, or firmware, and may be used interchangeably with terms such as, e.g., logic, logic block, component, or circuit. A module may be an integrally formed part or a minimum unit or a portion of the part that performs one or more functions. For example, according to an embodiment, the module may be implemented in the form of an application-specific integrated circuit (ASIC).

Various embodiments of the present document may be implemented as software (e.g., a program) including one or more commands stored in a storage medium (e.g., internal memory or external memory) readable by a machine (e.g., an electronic device). For example, a processor (e.g., CPU) of a device (e.g., an electronic device) may call one or more commands stored from a storage medium and execute it. This makes it possible for the device to be operated to perform one or more functions depending on the called one or more commands. The one or more commands may include codes generated by a compiler or executable by an interpreter. The device-readable storage medium may be provided in the form of a non-transitory storage medium. Herein, 'non-transitory' only indicates that the storage medium is a tangible device and does not include a signal (e.g., electromagnetic wave), and this term does not distinguish between a case in which data is stored semi-permanently in a storage medium and a case in which data is temporarily stored therein.

According to an embodiment, the method according to various embodiments disclosed in this document may be provided as being included in a computer program product. A computer program product may be traded between a seller and a buyer as a commodity. The computer program product may be distributed in the form of a machine-readable storage medium (e.g., compact disc read only memory (CD-ROM)), or may be distributed (e.g., downloaded or uploaded) via an application store (e.g., Play Store™), directly between two user devices (e.g., smart phones), or in an online manner. In the case of online distribution, at least a part of the computer program product may be at least temporarily stored or temporarily created in a machine-readable storage medium such as a memory of a server of a manufacturer, a server of an application store, or a memory of a relay server.

According to various embodiments, each component (e.g., a module or a program) of the above-described components may include a singular entry or a plurality of entities. According to various embodiments, one or more components or operations among the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components identically or similarly to being performed by the corresponding component among the plurality of components prior to the integration. According to various embodiments, operations performed by a module, program, or other component may be executed sequentially, in parallel, repeatedly, or heuristically, one or more of the operations may be executed in a different order or may be omitted, or one or more other operations may be added.

What is claimed is:

1. A touch device comprising:
a plurality of touch electrodes directly on one side of an encapsulation layer of an organic light-emitting display panel; and
a touch controller for measuring a voltage varied based on a short circuit resistance of the touch electrodes and detecting short-circuit states of the touch electrodes,
wherein the short circuit resistance of the touch electrodes is formed through a defect in the encapsulation layer between one of the touch electrodes and a common electrode of the organic light-emitting display panel disposed beneath the encapsulation layer to which a common voltage is applied, and
wherein the common voltage is applied in common to pixels in the display panel.

2. The touch device of claim 1, wherein
the touch controller includes an operational amplifier in which a reference voltage is applied to a non-inverted input end, a feedback resistor is connected between an output end and an inverted input end, and one of the touch electrodes is connected to the inverted input end.

3. The touch device of claim 2, wherein
the touch controller determines one of the touch electrodes to be short-circuited when the voltage at the output end is greater than the reference voltage.

4. The touch device of claim 1, wherein
the touch controller includes an operational amplifier in which one of the touch electrodes is connected to a non-inverted input end, a first resistor is connected between the non-inverted input end and a reference voltage, a feedback resistor is connected between an output end and an inverted input end, and a second resistor is connected between the inverted input end and the reference voltage.

5. The touch device of claim 1, wherein
the touch controller includes an operational amplifier in which one of the touch electrodes is connected to a non-inverted input end, a first resistor is connected between the non-inverted input end and a reference voltage, and an output end is connected to an inverted input end.

6. The touch device of claim 1, wherein
the touch controller includes an operational amplifier in which a first resistor is connected between an inverted input end and one of the touch electrodes, a first feedback resistor is connected between a non-inverted output end and the inverted input end, a second feedback resistor is connected between an inverted output end and a non-inverted input end, and a second resistor is connected between the non-inverted input end and a reference voltage, and
a voltage at the output end is a differential amplifying voltage of the voltage at the non-inverted output end and the voltage at the inverted output end.

7. A method for driving a touch device, comprising:
measuring a voltage that is varied based on a short circuit resistance through a defect in an encapsulation layer between one of a plurality of touch electrodes directly on one side of the encapsulation layer of an organic light-emitting display panel and a common electrode of the organic light-emitting display panel disposed beneath the encapsulation layer to which a common voltage is applied; and
detecting short-circuited states of the touch electrodes by using the voltage,
wherein the common voltage is applied in common to pixels in the display panel.

* * * * *